(12) United States Patent
Lacroix

(10) Patent No.: US 6,575,051 B2
(45) Date of Patent: Jun. 10, 2003

(54) DEVICE FOR RETAINING A SHEATH OF A REMOTE CONTROL VIA CABLE

(75) Inventor: Louis Jean Michel Lacroix, Champigny S/Marne (FR)

(73) Assignee: Valeo Electronique, Creteil (FR)

( * ) Notice: Subject to any disclaimer, the term of this patent is extended or adjusted under 35 U.S.C. 154(b) by 47 days.

(21) Appl. No.: 09/820,285

(22) Filed: Mar. 29, 2001

(65) Prior Publication Data

US 2001/0035066 A1 Nov. 1, 2001

(30) Foreign Application Priority Data

Mar. 31, 2000 (FR) .......................... 00 04150

(51) Int. Cl.[7] .............................. F16C 1/10
(52) U.S. Cl. ................... 74/502.4; 403/317; 403/321
(58) Field of Search .................. 74/502.4, 502.6; 248/74.2; 403/12, 315, 316, 317, 321, 322.4, 325, 329, 326

(56) References Cited

U.S. PATENT DOCUMENTS

| | | | | |
|---|---|---|---|---|
| 3,809,371 A | * | 5/1974 | Martini | 24/346 |
| 3,954,238 A | * | 5/1976 | Nivet | 248/68.1 |
| 4,386,752 A | * | 6/1983 | Pavlak et al. | 24/543 |
| 4,452,097 A | | 6/1984 | Sunkel | |
| 4,478,381 A | | 10/1984 | Pittion et al. | |
| 4,623,102 A | * | 11/1986 | Hough, Jr. | 24/543 |
| 4,922,783 A | * | 5/1990 | Wallace | 49/352 |
| 5,260,866 A | * | 11/1993 | Lisinski et al. | 700/97 |
| 5,390,876 A | * | 2/1995 | Hatano et al. | 248/68.1 |
| 5,494,245 A | * | 2/1996 | Suzuki et al. | 24/487 |
| 5,590,567 A | | 1/1997 | Marrs et al. | |
| 5,855,093 A | * | 1/1999 | Medebach | 49/352 |
| 5,887,487 A | * | 3/1999 | Bravo | 248/56 |

FOREIGN PATENT DOCUMENTS

| | | |
|---|---|---|
| DE | 4010992 | 10/1991 |
| DE | 29705650 | 6/1997 |
| FR | 2429922 | 1/1980 |
| JP | 360030817 A  * | 2/1985 |

* cited by examiner

Primary Examiner—Christopher P. Schwartz
Assistant Examiner—Xuan Lan Nguyen
(74) Attorney, Agent, or Firm—Liniak, Berenato & White

(57) ABSTRACT

A device for retaining a sheath of a remote control via cable has an attachment molded integrally with a support. The attachment has a base part arising from the support to delimit a housing for accommodating a fitting of the sheath, as well as a cover linked to the base part by a film hinge, in such a way that the cover is able to pivot between an opening position for the insertion of the fitting and a locking position for trapping the fitting. In the position for locking the cover, the end fitting is held in the housing, being immobilized axially and free in rotation.

15 Claims, 4 Drawing Sheets

DEVICE FOR RETAINING A SHEATH OF A REMOTE CONTROL VIA CABLE

FIELD OF THE INVENTION

The invention relates to remote mechanical controls via cable, and may be applied to motor-vehicle equipment.

BACKGROUND OF THE INVENTION

It relates more particularly to a device for retaining a sheath of a remote mechanical control via cable, in which the sheath is equipped with an end fitting which is suitable for being held on a support.

A remote control of this type usually comprises a sheath traversed by a cable which can be shifted in the sheath in an axial direction. The cable possesses two ends which are fastened respectively to an actuator and to a moveable element.

In one preferred application of the invention, the actuator is a rotary element of a control panel, while the moveable element is a flap forming part of a heating and/or air-conditioning installation of a motor vehicle.

In such a case, the sheath is equipped, at at least one of its ends, with an end fitting which is intended to be fastened to a support, for example to a control box. It is also possible for this end fitting to be located at the same end as the moveable element.

The end fitting is generally obtained by overmoulding onto the sheath and is provided in order to be fastened to the support in such a way that the corresponding end of the sheath is immobilized in a pre-defined position.

In the known devices of this type, the sheath is held on the support by way of a supplementary piece such as a screw, a staple, etc.

These known solutions consequently require a supplementary piece to be put in place, often requiring significant effort which is difficult to deploy, particularly on automatic assembly lines.

Moreover, the placing of this supplementary piece generally requires specific tooling, which increases the assembly times.

Furthermore, in the solutions of the prior art, the fixing of the sheath retains it rigidly on the support. This gives rise to difficulties in assembly, with stresses arising when the assembly is put in place. In fact twisting of the sheath may actually occur, which makes control via cable a more complicated matter.

The object of the invention is especially to overcome the abovementioned drawbacks.

The invention aims in particular to provide a device which makes it possible to retain such a control sheath by rapid-fixing means, which require neither a supplementary piece nor specific tooling, and which, furthermore, do not risk giving rise to twisting of the sheath.

SUMMARY OF THE INVENTION

To that end the invention proposes a device for retaining a sheath of a remote mechanical control via cable, the said sheath being equipped with an end fitting which is suitable for being held on a support, comprising an attachment molded integrally with the support and consisting of a base part arising from the support in order to delimit a housing for accommodating the fitting and of a cover linked to the base part by a film hinge, in such a way that the cover is able to pivot between an opening position for the insertion of the fitting and a locking position for trapping the fitting, and wherein, in the position for locking the cover, the end fitting is held in the housing, being immobilized axially and free in rotation Thus, the invention provides an attachment produced in a single piece with the support and essentially comprising a base part arising from the support and a cover capable of pivoting by way of a film hinge.

This hinge makes it possible to be able to allow the sheath to position itself on fitting by turning on itself, because the end fitting and the sheath are free in rotation.

This aspect of free rotation is very important since, once the sheath is attached at each of its ends, it will position itself by rotation on itself.

Such a hinge is produced by a local thinning of the material between the base part and the cover, in order to obtain a deformable region. This results in the cover being able to pivot with respect to the base part, while being of a piece with the latter.

In that way, an attachment is obtained which forms an integral part of the support and which is therefore obtained with the latter during the molding, so that the sheath can be held on the support without it being necessary to have recourse to a supplementary component, nor to special tooling.

In one preferred embodiment of the invention, the cover is able to pivot over an angular interval of about 90° between the opening position and the locking position.

The device of the invention advantageously comprises locking means for locking the cover onto the base part.

In one preferred embodiment, these locking means comprise a tab integral with the cover and suitable for becoming housed in an aperture of the base part in the locking position.

It is advantageous for the cover to be fitted internally with a retaining stop situated close to the film hinge and suitable for coming to bear behind an abutment rim formed within the base part, when the cover is in closed position.

This achieves additional security for the case where the film hinge might be accidentally damaged. This is because the end fitting of the sheath is held in the attachment even if the film hinge becomes broken.

According to another advantageous characteristic of the invention, the cover comprises a shaped inner wall suitable for defining a part of a cradle for accommodating the fitting.

In such a case, provision is advantageously made for the base part to define another part of this accommodation cradle.

In one preferred embodiment of the invention, the base part comprises a first wall to which the cover is linked and a second wall, opposite the first wall, and suitable for interacting with the cover for locking.

Advantageously, this second wall is capable of deflecting elastically when the cover is locked.

In this preferred embodiment, the base part further comprises two side walls, spaced apart and arranged between the first wall and the second wall so as to define a quadrangular structure.

Thus, these four walls define a sort of shaft amounting to a housing for the fitting of the cable.

The two abovementioned side walls advantageously define an internal spacing which corresponds to the axial length of the fitting.

Thus, when the fitting is placed in the housing, the two side walls form abutments limiting the axial movement of the fitting.

The fitting may adopt various forms. Thus it may have a generally axisymmetric shape, in particular a generally cylindrical shape, or may even include an external threading.

The support is advantageously formed by molding of a thermoplastic material, particularly of the polyethylene, polypropylene, ABS, etc. type.

The attachment of the invention is defined in such a way as to cope with the pull-off stresses dictated by the constructor. The necessity of resisting being pulled off is due to the fact that, in the event of the attachment being decoupled from the sheath and from its fixing support, it then becomes difficult to control a moveable element. This is the case especially in the control of the flaps of a motor-vehicle heating and/or air-conditioning installation.

In one preferred application of the invention, the support forms part of a control box of motor-vehicle equipment.

BRIEF DESCRIPTION OF THE DRAWINGS n the description which follows, given solely by way of example, reference is made to the attached drawings, in which.

DESCRIPTION OF THE PREFERRED EMBODIMENTS

Figure 1:
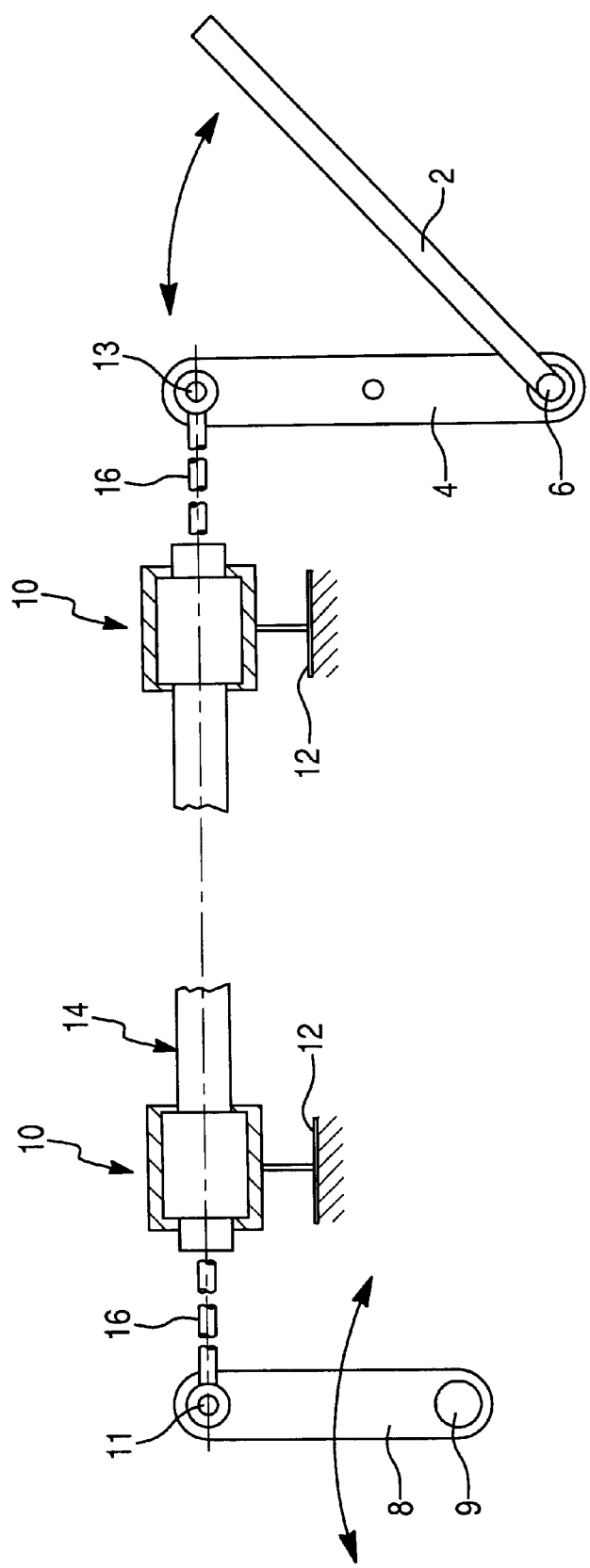
FIG. 1 represents a mechanical remote control via cable applied to the control of equipment, and comprising a sheath retained by two retaining devices according to the invention.

In the various figures, like reference numerals indicated like parts.

Referring first to FIG. 1, a mechanical remote control via cable is shown, applied to the control of equipment, in the example a flap 2, which is integral in rotation with a lever 4 mounted pivoting about a spindle 6. The lever 4 is controlled in rotation from an actuator 8, such as a rotary control element, mounted so as to rotate about a spindle 9 and carried by a control box (not represented).

In one preferred application of the invention, this control box is housed in a dashboard of a motor vehicle, and the flap 2 is provided for managing a flow of air into an installation for heating and/or air-conditioning the passenger compartment of the vehicle.

The mechanical control of FIG. 1 comprises a sheath 14 traversed by a control cable 16, usually a single-strand or multi-strand cable produced from steel, and this sheath is held by two retaining devices 10, also called attachments, according to the invention.

The cable comprises a first end 11 forming a fitting and fastened to the actuator 8 and a second end 13 forming a fitting and fastened to the flap 2.

The sheath 16 is held in the vicinity of its ends by two substantially identical retaining devices 10 provided on the vehicle, that is to say respectively on the control box and on the heating and/or air-conditioning installation.

Figure 2:
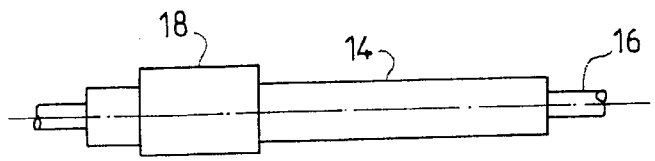
FIG. 2 is a sectional view of a device for retaining a sheath of a remote control via cable, the sheath being represented before insertion into the device.
Figure 2:
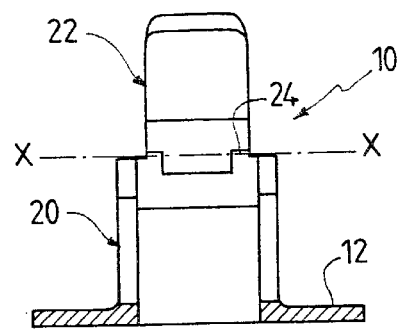

Referring now to FIG. 2, one of the two abovementioned retaining devices is shown. This device comprises an attachment 10 molded integrally with a support 12 (represented partially), consisting of a box such as the abovementioned control box, for example.

The sheath 14 includes a fitting 18, of generally circular cylindrical shape in this example, which is overmoulded externally and which is provided in order to work with the attachment 10. The attachment 10 is intended to hold this sheath in a defined position with respect to the support 12 so as to immobilize it axially, while leaving it free in rotation. This attachment 10 is molded integrally with the support 12, the whole being produced from an appropriate plastic, generally a thermoplastic, in particular of the polyethylene, polypropylene, ABS, etc, type.

The attachment 10 consists essentially of a base part 20 arising from the support and of a cover 22 linked to the base part via a film hinge 24 in such a way that the cover can pivot with respect to the base part about an axis of articulation X—X.

It is known, in plastics technology, to produce what is known as a "film hinge" by a localized thinning of the plastic in order to obtain a region of deformation between two elements forming part of the same component and which thus remain integral with one another.

In general, a region of thinning is produced, the thickness of which lies, for example, between ⅒ and ²⁄₁₀ mm thick.

As will be seen later on, the cover is able to pivot with respect to the base part between an open position as represented in FIG. 2, in order to allow the fitting to be inserted between the base part and the cover, and a closing or locking position in which the cover is folded down towards the base part in order jointly to define a housing, of a shape matching that of the fitting, in order to hold the latter captive, that is to say immobilized axially and free in rotation.

Figure 3:
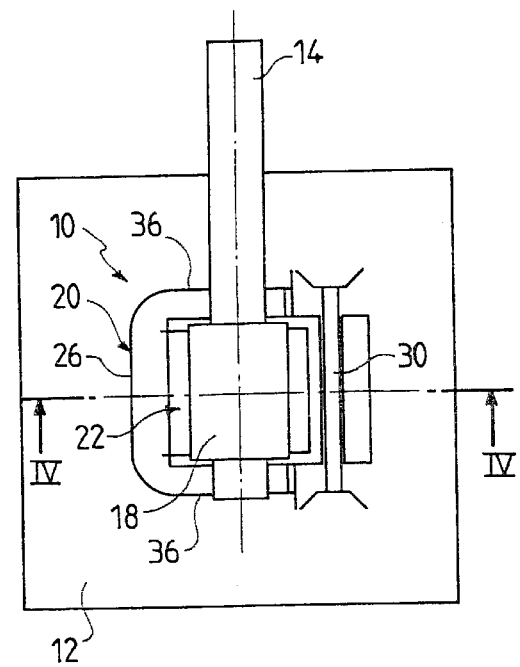
FIG. 3 is a top view corresponding to FIG. 2 in a later phase in which the cover is in open position.
Figure 5:
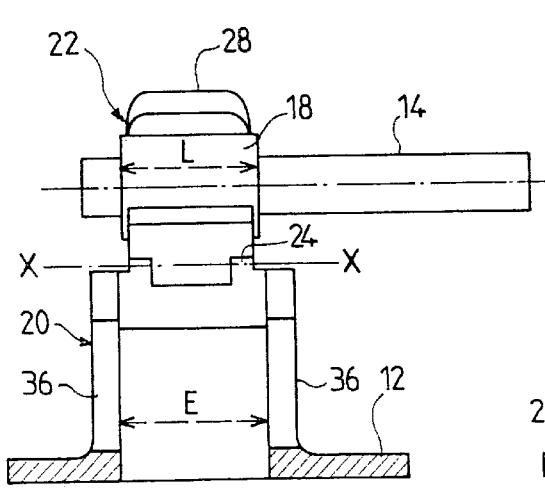
FIG. 5 is a sectional view along the line V—V of FIG. 4.
Figure 4:
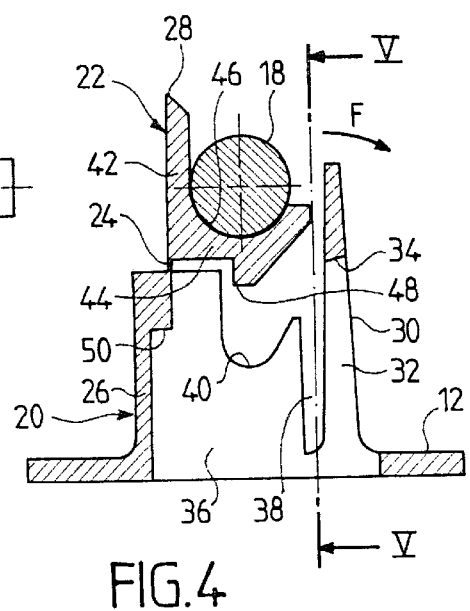
FIG. 4 is a sectional view along the line IV—IV of FIG. 3.

Referring now to FIGS. 3 to 5, different views of the device of the invention are shown, in which the cover is in open position and the sheath is applied against the inside of the cover. As can be seen in these figures, the base part 20 has a structure of generally quadrangular form defining a sort of "shaft".

The base part 20 comprises a first wall 26 which is erected from the support 12 and to which the cover 22 is linked via the film hinge 24. The cover 26, at the opposite end to the film hinge 24, includes a tab 28 in chamfer shape, the function of which will be explained later on.

The base part 20 further comprises a second wall 30 opposite to the first wall 26 and extending substantially parallel to it. This second wall is also erected from the support 12 but over a height greater than that of the wall 26.

The wall 30 is hollowed in such a way as to define an internal slot or aperture 32 bounded especially by a rim 34 intended to work with the tab 28 in order jointly to form means for locking the cover with respect to the base part, as will be seen later on.

The wall 30 is capable of deflecting with respect to the support 12 in such a way as to move away from the wall 26 in the direction of the arrow F (FIGS. 4 and 9), as will be seen later on.

The base part 20 further comprises two spaced-apart side walls 36 which are each arranged between the first wall 26 and the second wall 30 in order to define the abovementioned quadrangular structure.

Figure 9:
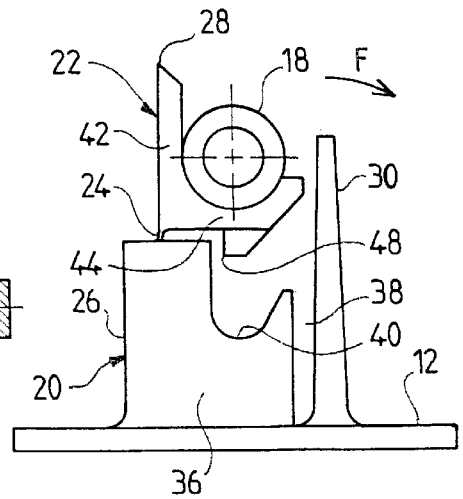
FIG. 9 is a side view corresponding to FIG. 4.

As can be seen more particularly in FIGS. 3, 4 and 9, the walls 36 are each linked to the wall 26 but are not attached to the wall 30, in order to allow it to deflect. To that end, each of the walls 36 includes a longitudinal slot 38, which makes it possible to decouple the wall 30 from the side walls 36.

The walls 36 are arranged face-to-face and form between them a spacing E (FIG. 5) which is substantially equal, in its larger value, to the axial length L of the fitting 18. This makes it possible to lodge the fitting between the two walls 36 so as to immobilize it in the axial direction, while leaving it free in rotation, even after the cover 22 is closed.

Furthermore, as can be seen more particularly in FIGS. 4 and 9, each of the side walls 36 includes a U-shaped recess 40 for accommodating the sheath 14, on either side of the fitting.

Thus, the base part 26 contributes to defining a housing, also called cradle, for accommodating the fitting of the sheath.

The cover 22 (FIG. 4) comprises a branch 42 which constitutes the cover proper and which is extended by the tab 28 and a branch 44 which extends in a direction generally perpendicular to the branch 42 inwards.

This branch 44 is shaped to define, on the one hand, and jointly with the branch 42, a U-shaped housing 46 for accommodating the fitting (FIGS. 4 and 9). Thus, in this open position of the cover, the fitting 18 can be accommodated in this shaped inner wall 46, which defines a part of a cradle for accommodating the fitting.

At the opposite end, the branch 44 defines a retaining abutment 48 directed inwards and situated close to the film hinge 24. This abutment is able to come to bear behind an abutment rim 50 formed inside the base part, on the inner side of the wall 26. The abutment 48 is able to interact with the abutment rim 50 after the cover has been pivoted.

In the position of FIGS. 3 to 5 and 9, the cover is in open position, the branch 42 being turned up vertically in a plane generally parallel to that of the wall 26. In this position, the fitting 18 is accommodated in the inner wall 46 of the cover, at least partly forming a cradle for accommodating the fitting.

Next, the cover 42 is made to pivot about the articulation defined by the film hinge 24 in the clockwise direction, as shown by the arrow F in FIGS. 4 and 9.

Figure 6:
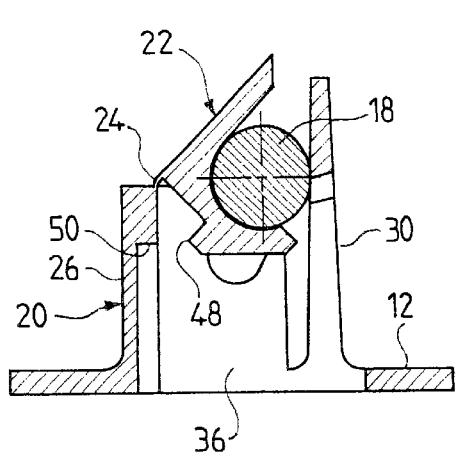
FIG. 6 is a view similar to FIG. 4 in a later phase, between the open position and a position for locking of the cover.

The cover thus passes through a multiplicity of intermediate positions, one of which is represented in FIG. 6. In this intermediate position, the cover has pivoted by about 45° with respect to the previous position. It has brought with it the fitting which is therefore located partly trapped between the cover 22 and the wall 30.

Figure 7:
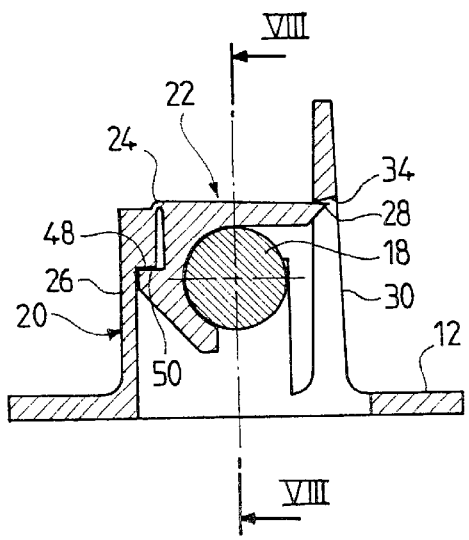
FIG. 7 is a view similar to FIG. 6 in which the cover is in locking position.
Figure 8:
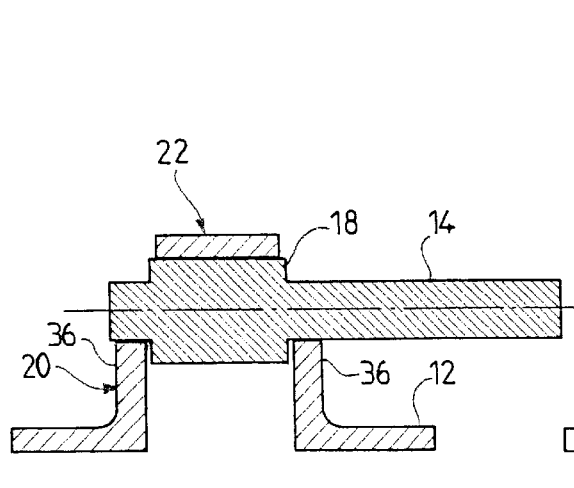
FIG. 8 is a sectional view along the line VIII—VIII of FIG. 7.

Next, the cover is made to pivot further so as to bring it into a closing position, also called locking position, as represented in FIGS. 7 and 8.

In this position, the cover has pivoted by about 90° with respect to the open position of FIGS. 4 and 9. The tab 28, which has a chamfered shape, has pushed back the wall 30, which has deflected in the direction of the arrow F. Thus, this tab has arrived under the rim 34 in order to lock the cover with respect to the base part, when the wall 30 has come back into its initial position because of its intrinsic elasticity.

In the position of FIGS. 7 and 8, the fitting 18 of the sheath is trapped in the housing delimited by the base part and the cover. It is held axially between the side walls 36 of the base part and radially by the inner wall 46 of the cover as well as by the U-shaped recesses 40 of the walls 46 which surround the sheath on either side of the fitting.

Thus, the fitting can easily be put in place in the cover, in open position, then immobilized after pivoting of the cover with respect to the base part, as far as the locking position, while still allowing the sheath to turn on itself. Thus, the retaining device of the invention provides a pivot by virtue of which the fitting of the sheath and the sheath can turn freely, avoiding any risk of twisting of the sheath.

In the locking position of FIG. 7, the abutment 48 comes into interaction with the abutment rim 50, which provides security. This is because, if the film hinge were accidentally damaged, the abutment and the abutment rim would interact to prevent the cover becoming detached from the wall 26.

Normally, such an attachment is designed to be actuated during initial assembly, and possibly on the occasion of a repair, so that the firm hinge is not intended to operate several times.

If it is necessary to release the fitting, it is sufficient to space the wall 30 away in order to free the tab 28 and to make the cover pivot in the reverse direction so as to bring it into the opening position.

In the above-described embodiment, the fitting has a generally cylindrical axisymmetric shape.

However, it could be envisaged that it be given other shapes, while preserving the possibility of its turning on itself.

Figure 10:
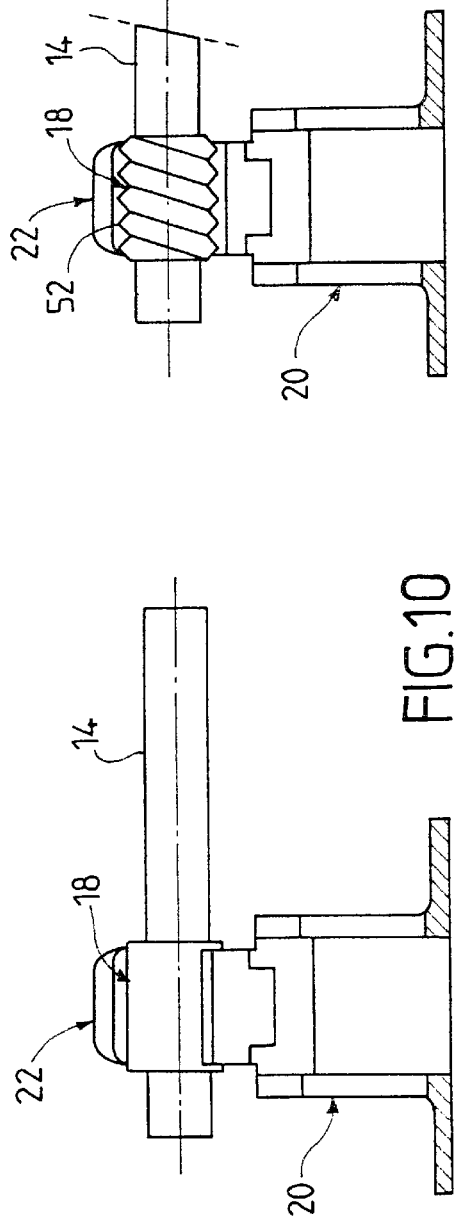

In the embodiment of FIG. 10, the fitting 18 consists of a simple cylinder.

Figure 11:
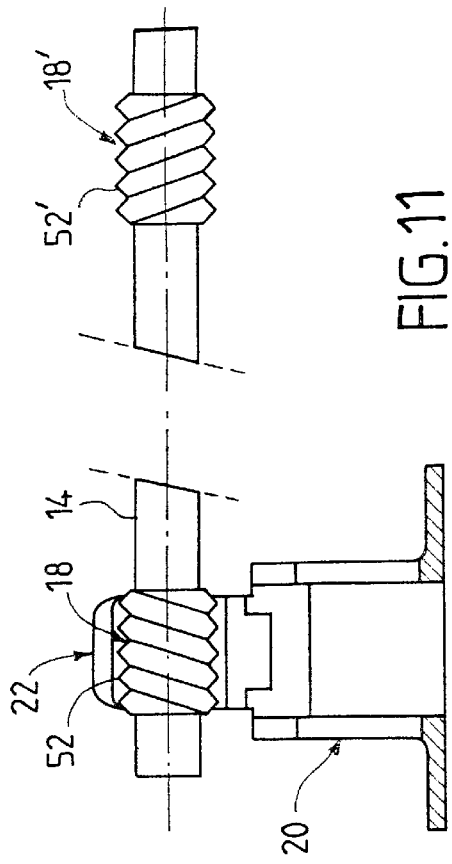
FIGS. 10 to 13 are sectional views similar to FIG. 5 and corresponding to fittings of different shapes.

In the embodiment of FIG. 11, the fitting 18 includes an external threading 52 forming a screw thread. In such case, it is possible to provide a similar fitting 18' including a screw thread 52' at the other end of the sheath, in such a way that the screw threads 52 and 52' are reversed.

Figure 12:
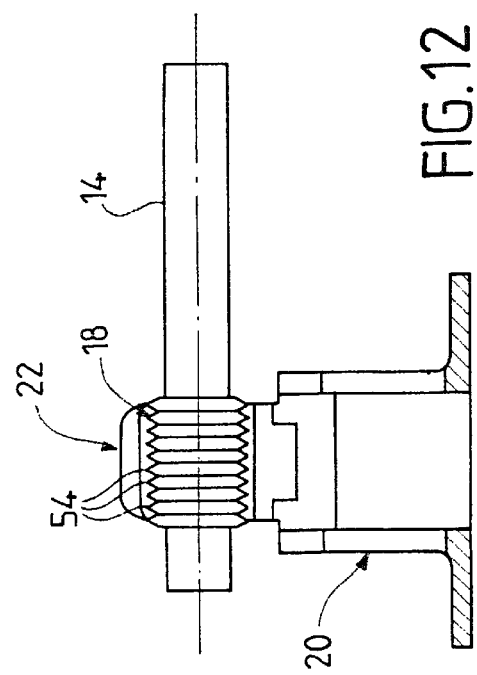

In the embodiment of FIG. 12, the fitting 18 includes ribbing 54, which makes it possible to provide for setting-up.

Figure 13:
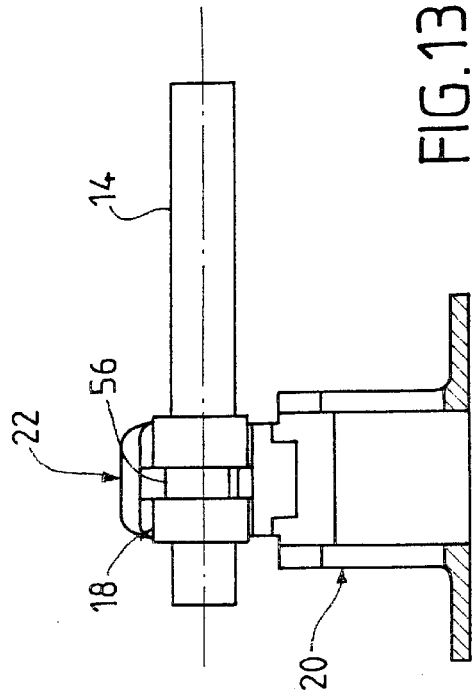

Finally, in the embodiment of FIG. 13, the fitting 18 has an axisymmetric shape and it comprises an annular slot 56.

It will be understood that it is possible to hold the sheath with at least one attachment 10, preferably with two attachments 10, that is to say, here, at the control-box end and/or at the installation end.

The invention finds a preferred application to remote controls via cable for motor-vehicle equipment.

Needless to say, it is not limited to the embodiments described above by way of examples and extends to other variants.

What is claimed is:

1. A device for retaining a sheath of a remote mechanical control via cable, said sheath being equipped with an end fitting which is suitable for being held on a support, said device comprising an attachment molded integrally with the support, a base part arising from the support in order to delimit a housing for accommodating the fitting, and a cover linked to the base part by integrally molded film hinge defining a region of localized thinning of material also used to form said cover and said base part, in such a way that the cover is able to pivot between an opening position for the insertion of the fitting and a locking position for trapping the fitting, and wherein, in the locking position for locking the cover, the end fitting is held in the housing, being immobilized axially and free in rotation.

2. The device according to claim 1, wherein the cover is able to pivot over an angular interval of about 90° between the opening position and the locking position.

3. The device according to claim 1, and comprising locking means for locking the cover onto the base part.

4. The device according to claim 1, and comprising a tab for locking the cover onto the base part, wherein the tab is integral with the cover and suitable for becoming housed in an aperture of the base part in the locking position.

5. The device according to claim 1, wherein the cover is fitted internally with a retaining stop situated close to the film hinge and suitable for coming to bear behind an abutment rim formed within the base part, when the cover is in locking position.

6. The device according to claim 1, wherein the cover comprises a shaped inner wall suitable for defining a part of a cradle for accommodating the fitting.

7. The device according to claim 6, wherein the base part defines another part of the cradle for accommodating the fitting.

8. The device according to claim 1, wherein the fitting has a generally axisymmetric shape, in particular a generally cylindrical shape.

9. The device according to claim 1, wherein the fitting includes an external threading.

10. The device according to claim 1, wherein the support is formed by molding of a thermoplastic material.

11. The device according to claim 1, wherein the support forms part of a control box of motor-vehicle equipment.

12. A device for retaining a sheath of a remote mechanical control via cable, said sheath being equipped with an end fitting which is suitable for being held on a support, said device comprising an attachment molded integrally with the support, a base part arising from the support in order to delimit a housing for accommodating the fitting, and a cover linked to the base part by a film hinge, in such a way that the cover is able to pivot between an opening position for the insertion of the fitting and a locking position for trapping the fitting, and wherein, in the locking position for locking the cover, the end fitting is held in the housing, being immobilized axially and free in rotation, wherein the base part comprises a first wall to which the cover is linked and a second wall, opposite the first wall, and suitable for interacting with the cover for locking.

13. The device according to claim 12, wherein the second wall is capable of deflecting elastically when the cover is locked.

14. The device according to claim 12, wherein the base part further comprises two side walls, spaced apart and arranged between the first wall and the second wall so as to define a quadrangular structure.

15. The device according to claim 14, wherein the two side walls of the base part define an internal spacing which corresponds to the axial length of the fitting.

* * * * *